March 31, 1964     T. SCOTT ETAL     3,126,569

WINDOW CLEANING MECHANISM

Filed Oct. 15, 1962     2 Sheets-Sheet 1

INVENTORS
THOMAS SCOTT
DICK H. WILLIAMS
BY *W. E. Finken*
THEIR ATTORNEY

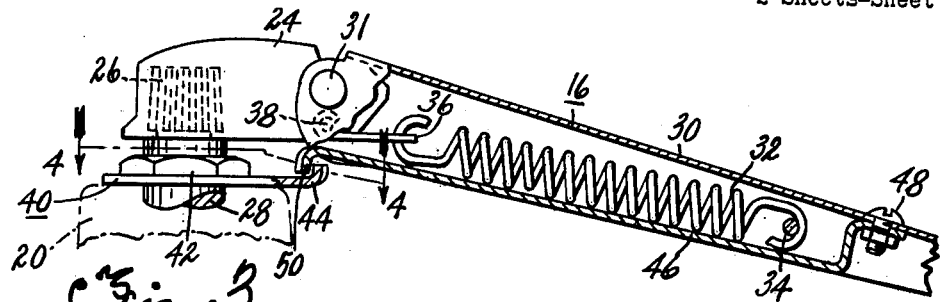
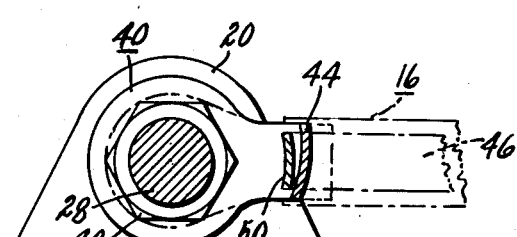
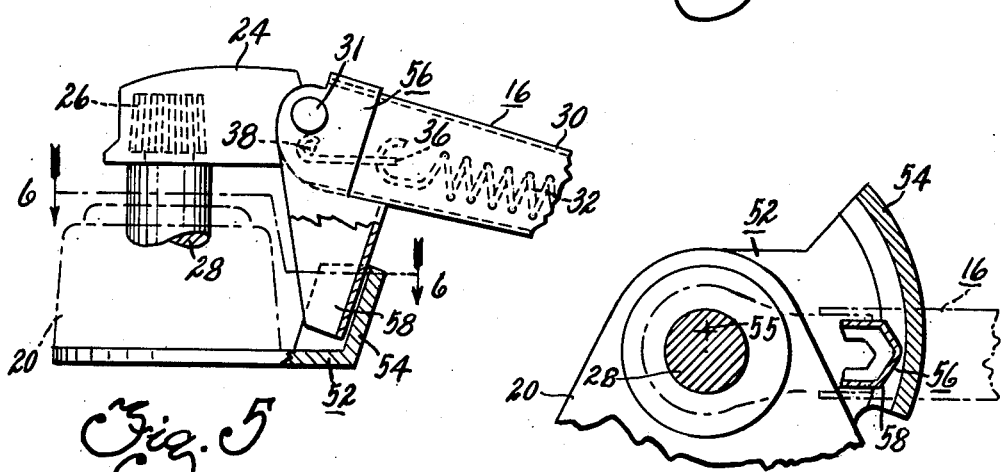
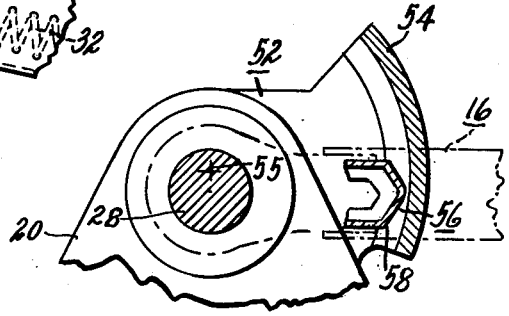

United States Patent Office 3,126,569
Patented Mar. 31, 1964

3,126,569
WINDOW CLEANING MECHANISM
Thomas Scott, Royal Oak, and Dick H. Williams, Oak Park, Mich., assignors to General Motors Corporation, Detroit, Mich., a corporation of Delaware
Filed Oct. 15, 1962, Ser. No. 230,418
6 Claims. (Cl. 15—250.35)

This invention pertains to cleaning mechanism for vehicle windows, and particularly to restraining means for precluding pivotal movement between spring biased wiper arm sections under certain conditions.

In copending application Serial No. 230,417, filed of even date herewith in the name of Lothrop N. Forbush et al. and assigned to the assignee of this invention, a cleaning system for the tailgate window of a station wagon type vehicle is disclosed wherein the wiper blade and arm assembly is parked in a substantially horizontal position against the upper edge of the tailgate when not in use. It is recognized that station wagons are sometimes driven with the tailgates in a horizontal position when hauling bulky objects and driven across fields and other rough terrain such that the tailgate comes into contact with vegetation, etc. Under these conditions, it is possible to entangle vegetation with the wiper arm and blade assembly so as to either pivot the wiper arm and blade assembly away from the tailgate and damage component parts thereof, or simultaneously pivot the arm and blade assembly away from the tailgate and affect angular displacement thereof so that the pressure applying spring will force the blade over the upper edge of the lowered tailgate window into interfering relation therewith should the trailgate window be raised. The present invention relates to means for precluding outward pivotal movement between the sections of a wiper arm mounted on a tailgate when it is in its parked position.

Accordingly, among our objects are the provision of window cleaning mechanism including a wiper arm having pivotally interconnected sections and means for precluding pivotal movement between the arm sections away from the window when the cleaner assembly is in its parked position; the further provision of a wiper arm restrainer comprising coacting abutment means on the transmission housing and the wiper arm for precluding outward pivotal movement of the wiper arm in a predetermined angular position thereof; the further provision of a wiper arm restrainer of the aforesaid type wherein one of said abutment means is integral with the wiper arm spring cover; and the still further provision of a wiper arm restrainer of the aforesaid type where one of said abutment means comprises a bracket attached to said wiper arm.

The aforementioned and other objects are accomplished in the present invention by orienting the coacting abutment means on the wiper arm and the transmission housing such that the abutment means are engageable only in the parked position of the wiper arm and blade assembly. Specifically, two embodiments of the restrainer means are disclosed herein. In one embodiment a stationary plate having an arcuate flange is attached to the transmission housing, and the wiper arm spring cover is formed with a coacting flange such that when the flanges are in alignment with each other with the wiper blade and arm assembly in the parked position, outward pivotal movement of the blade carrying section is precluded. In the second embodiment the blade carrying section of the wiper arm has a bracket attached thereto by the pin for pivotally interconnecting the blade carrying section with the mounting section, a leg of the bracket extending substantially normal to the longitudinal axis of the wiper arm and coacting with an arcuate flange on a stationary plate for precluding outward pivotal movement of the blade carrying arm section when the wiper blade and arm assembly is in the parked position. In both embodiments operating clearance is provided between the coacting flanges so as not to impair operation of the cleaner assembly during normal wiping.

Further objects and advantages of the present invention will be apparent from the following description, reference being had to the accompanying drawings, wherein preferred embodiments of the present invention are clearly shown and wherein similar numerals depict similar parts throughout the several views.

In the drawings:

FIGURE 3 is a fragmentary view, partly in section and partly in elevation, taken generally along line 3—3 of FIGURE 1.

FIGURE 4 is a sectional view taken along line 4—4 of FIGURE 3 with certain parts shown in phantom.

FIGURE 5 is a view similar to FIGURE 3 of a modified embodiment of the wiper arm restrainer.

FIGURE 6 is a fragmentary sectional view with certain parts shown in phantom, taken along line 6—6 of FIGURE 5.

Figure 1:
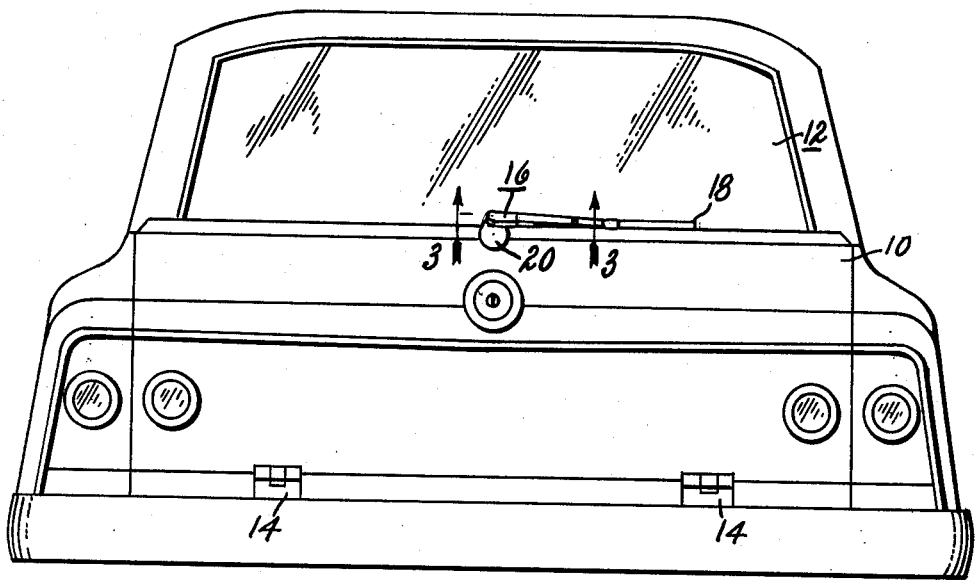
FIGURE 1 is a view in elevation of a vehicle equipped with the wiper arm restrainer of the present invention.
Figure 2:
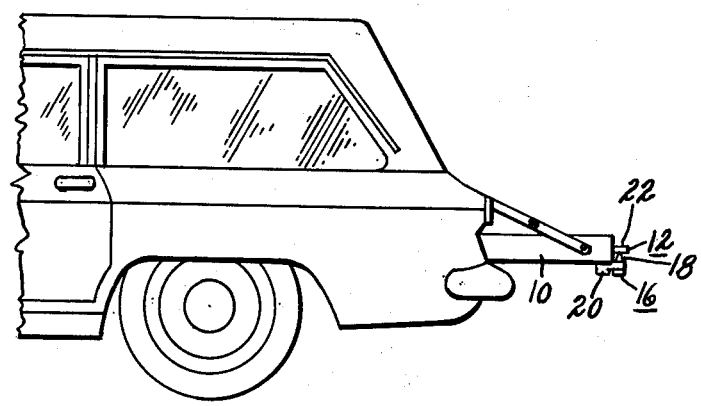
FIGURE 2 is a fragmentary side view of the vehicle with the tailgate in a substantially horizontal position.

As alluded to hereinbefore, the present invention is designed for use in a cleaning system for the tailgate window of station wagon type vehicles. Thus, FIGURE 1 depicts a vehicle having a tailgate 10 carrying a window 12 capable of being raised and lowered, the tailgate 10 being swingable about a substantially horizontal axis on hinges 14 between a closed substantially vertical position as shown in FIGURE 1, and an open substantially horizontal position as shown in FIGURE 2. A power driven wiper arm 16 carrying a wiper blade 18 is oscillatable across the outer surface of the window 12 for cleaning the same. The wiper arm 16 is attached to a rockshaft, not shown in FIGURE 1, journalled in a transmission housing 20 attached to the tailgate 10 adjacent its upper edge.

The wiper arm and blade assembly is shown in its parked position in FIGURE 1 whereat it is in a substantially horizontal position in firm engagement with the upper edge of the tailgate 10. When the window 12 is lowered into the tailgate 10 the upper edge 22 of the window projects above the upper edge of the tailgate 10 as shown in FIGURE 2, and the wiper blade 18 is thus maintained in engagement with the window 12 irrespective of whether the window 12 is fully raised or fully lowered.

Referring to FIGURE 3, the wiper arm 16 comprises a mounting section 24 having a socket recess for attachment to a serrated spindle 26 anchored to a rockshaft 28. A blade carrying section 30 of channel shape is pivotally connected to the mounting section 24 by a pin 31 which extends substantially transversely of the longitudinal arm axis thus enabling movement of the blade carrying section 30 towards and away from the window 12. An extension spring 32 is disposed between the side walls of the channelled blade carrying section 30, one end of the spring 32 being attacheed to a pin 34 and the other end being attached to a retainer 36 pivotally mounted on a pin 38 in the mounting section 24. The extension spring biases the blade carrying section 30 in the clockwise direction about the pin 31 so as to apply pressure to the wiper blade 18 and maintain it in engagement with the window 12.

In order to prevent damage to the wiper arm and blade assembly when the tailgate 10 is in a horizontal position as shown in FIGURE 2, and also to prevent the blade and arm assembly from being lifted from the window 12 and over the edge 22 of the window 12 when the blade and arm assembly is in its parked position, a plate 40 is secured to the transmission housing 20 by a spanner nut 42. The plate 40 has a radial extension with an upstanding arcuate flange 44 as shown in FIGURES 3 and 4. A spring cover 46 is attached to the channel-shape blade carrying arm section 30 by a threaded fastener 48 at its outer end. The inner end of the spring cover 46 is formed with a downwardly extending arcuate flange 50 that coacts with the flange 44 to preclude counterclockwise, or outward, pivotal movement of the blade carrying arm section 30 when the wiper arm and blade assembly is in its parked position. The flanges 44 and 50 do not engage each other during normal oscillation of the wiper arm and blade assembly across the window 12. Moreover, the coacting flanges only restrict outward pivotal movement of the blade carrying section relative to the mounting section 24 in a predetermined angular position of the wiper arm and blade assembly, namely when the wiper arm and blade assembly is in its parked position as shown in FIGURE 1.

Referring to FIGURES 5 and 6, a second embodiment of the wiper arm restrainer is disclosed comprising a plate 52 having an upwardly inclined elongate arcuate flange 54, the plate 52 being suitably attached to the transmission housing 20. The axis 55 of generation of the arcuate flange 54 is located above the axis of the rockshaft 28 as shown in FIGURE 6. The wiper arm 16 includes a mounting section 24 attached to the rockshaft spindle 26 and a blade carrying section 30 pivotally connected to the mounting section by a transversely extending pin 31. As in the first embodiment, the blade carrying section 30 is biased towards the window 12 by an extension spring 32. However, in the second embodiment a U-shaped bracket 56 is attached to the inner end of the blade carrying section 30 by the pin 31 in superposed relation thereto. The U-shaped bracket 56 has a leg portion 58 that coacts with the flange 54 to preclude outward pivotal movement of the blade carrying section 30 when the wiper arm and blade assembly are in a predetermined angular position, namely the parked position. As in the first embodiment, the leg portion 58 of the U-shaped bracket 56 does not engage the arcuate flange 54 during normal oscillatory movement of the wiper blade and arm assembly across the window 12.

While the embodiments of the invention as herein disclosed constitute preferred forms, it is to be understood that other forms might be adopted.

What is claimed is as follows:

1. Window cleaning mechanism including, a transmission housing, a rockshaft rotatably supported in said housing, a wiper arm having a mounting section drivingly connected to said rockshaft and a blade carrying section spring hinged to said mounting section, and coacting abutment means attached to said housing and said blade carrying section for precluding outward pivotal movement of said blade carrying section at a predetermined angular position of said wiper arm relative to said housing, said abutment means being spaced from each other and nonengageable during oscillatory movement of said rockshaft.

2. Window cleaning mechanism including, a transmission housing, a rockshaft rotatably supported in said housing, a wiper arm having a mounting section drivingly connected to said rockshaft, a blade carrying section pivotally connected to said mounting section and spring means biasing said blade carrying section relative to said mounting section towards an associated window, and coacting abutment means attached to said housing and said blade carrying section for precluding pivotal movement of said blade carrying section away from said associated window at a predetermined angular position of the windshield wiper arm relative to said housing, said abutment means being spaced from each other and nonengageable during oscillatory movement of said rockshaft.

3. Window cleaning mechanism including, a transmission housing, a rockshaft journalled in said housing, a wiper arm having a mounting section drivingly connected to said rockshaft, a radially extending blade carrying section pivotally connected to said mounting section and spring means biasing said blade carrying section relative to said mounting section towards an associated window, a wiper blade carried by said arm and oscillatable across the surface of said window to and from a parked position, and coacting abutment means attached to said housing and said blade carrying section for precluding outward pivotal movement of said blade carrying section when the wiper blade is in its parked position, said abutment means being spaced from each other and nonengageable during oscillatory movement of said rockshaft.

4. Window cleaning mechanism including, a transmission housing, a rockshaft journalled in said housing, a wiper arm having a mounting section drivingly connected to said rockshaft, a radially extending blade carrying section pivotally connected to said mounting section and spring means biasing said blade carrying section relative to said mounting section towards an associated window, said blade carrying section being of channel shape, said spring means comprising an extension spring disposed within said channel-shaped blade carrying section, a wiper blade carried by said arm and oscillatable across the surface of said window to and from a parked position, a stationary plate attached to said housing having an arcuate flange extending towards said mounting section, and an abutment attached to said blade carrying section comprising a cover for said extension spring having a flanged end extending towards said plate and normally spaced from the arcuate flange thereof, said abutment coacting with said plate for precluding outward pivotal movement of said blade carrying section when the wiper blade is in its parked position.

5. Window cleaning mechanism including, a transmission housing, a rockshaft journalled in said housing, a wiper arm having a mounting section drivingly connected to said rockshaft, a radially extending blade carrying section pivotally connected to said mounting section and spring means biasing said blade carrying section relative to said mounting section towards an associated window, a wiper blade carried by said arm and oscillatable across the surface of said window to and from a parked position, a stationary plate attached to said housing and having an upstanding arcuate flange, and a bracket attached to the blade carrying section of said arm having a leg portion extending normal to the longitudinal axis of said wiper arm and normally spaced from said upstanding flange for coacting with said plate to preclude outward pivotal movement of said blade carrying section when the wiper blade in its parked position.

6. Cleaning mechanism for a window in a tailgate swingable about a horizontal axis between substantially vertical and horizontal positions including, a transmission housing attached to the tailgate adjacent the upper edge thereof, a rockshaft rotatably journalled in said housing, a wiper arm having a mounting section drivingly connected to said rockshift and a blade carrying section spring hinged to said mounting section, a wiper blade carried by said wiper arm for movement across the outer surface of the window to and from a parked position, and coacting abutment means attached to said housing and said blade carrying section for precluding outward pivotal movement of said blade carrying section when the wiper blade is in its parked position, said abutment means being spaced from each other and nonengageable during oscillatory movement of said rockshaft.

References Cited in the file of this patent

UNITED STATES PATENTS 2,715,238     Krohm _____ Aug. 16, 1955

FOREIGN PATENTS 826,115     Great Britain _____ Dec. 23, 1959